United States Patent

Pristash

[11] 4,050,536
[45] Sept. 27, 1977

[54] POWER DRIVE SYSTEM

[76] Inventor: David J. Pristash, 930 Greener Place, Fairview, Pa. 16415

[21] Appl. No.: 661,290

[22] Filed: Feb. 25, 1976

[51] Int. Cl.² .................. B60K 3/00; B60K 13/06
[52] U.S. Cl. ............................. 180/66 B; 60/613;
180/54 A; 188/264 AA
[58] Field of Search .............. 180/66 B, 66 A, 66 R,
180/54 A, 69 R; 188/264 AA; 60/613, 619,
623, 614

[56] References Cited

U.S. PATENT DOCUMENTS

| 980,382 | 1/1911 | Willis | 60/613 |
|---|---|---|---|
| 1,932,698 | 10/1933 | Jose | 180/66 B |
| 2,416,128 | 2/1947 | Swennes | 180/54 A |
| 2,869,659 | 1/1959 | Mayo | 180/54 A |
| 3,513,929 | 5/1970 | Kim | 180/66 A |
| 3,847,058 | 11/1974 | Manor | 60/370 |
| 3,878,913 | 4/1975 | Lionis et al. | 180/65 DD |

Primary Examiner—Joseph F. Peters, Jr.
Assistant Examiner—David M. Mitchell
Attorney, Agent, or Firm—E. Barron Batchelder

[57] ABSTRACT

A power driven wheeled vehicle with a power source consisting of an internal combustion engine, a compressor section, a heat reservoir and driven motor located at the wheels. The said internal combustion engine drives the said compressor section which uses the said engine's exhaust and cooling air as the input source. The said compressor supplies the said reservoir which supplies the said drive motors through a control valve driving the wheels of the said vehicle.

5 Claims, 6 Drawing Figures

U.S. Patent  Sept. 27, 1977  4,050,536
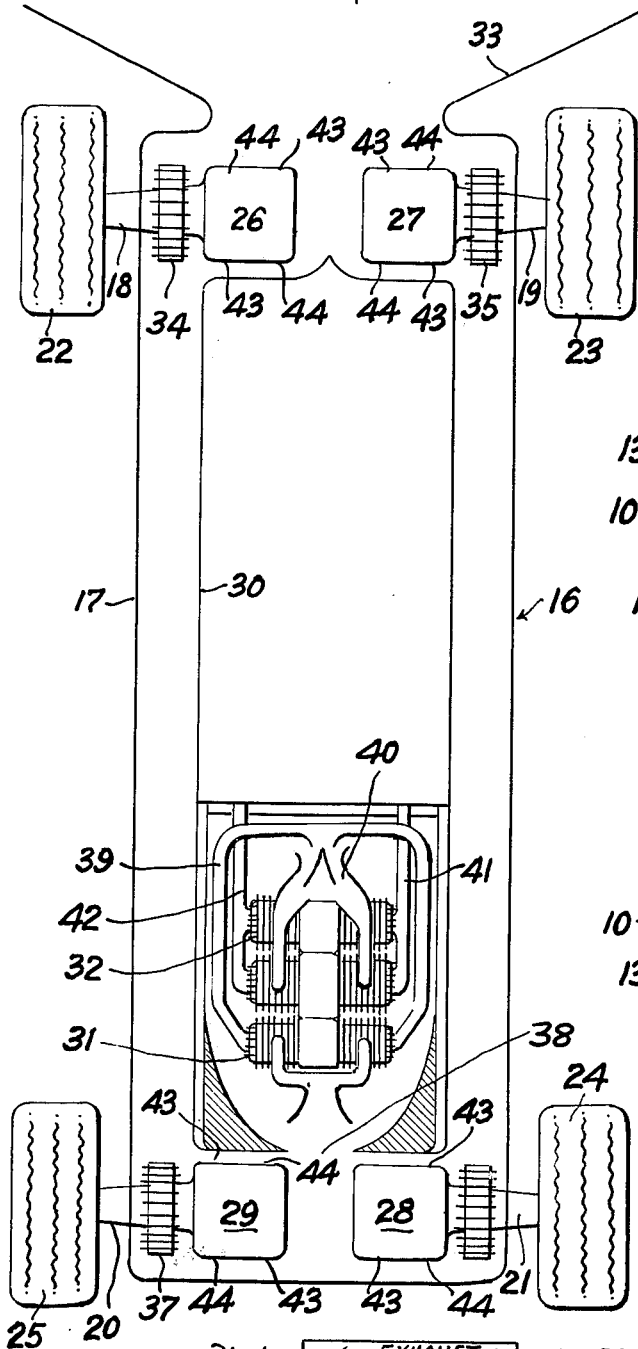
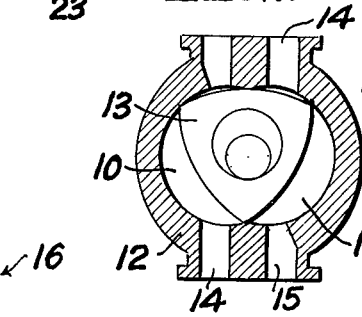
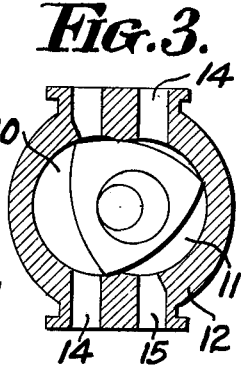
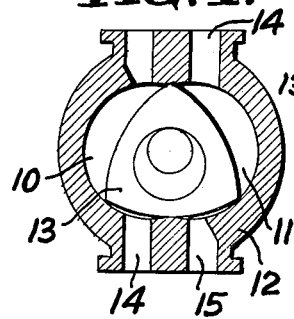
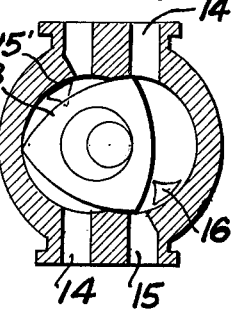
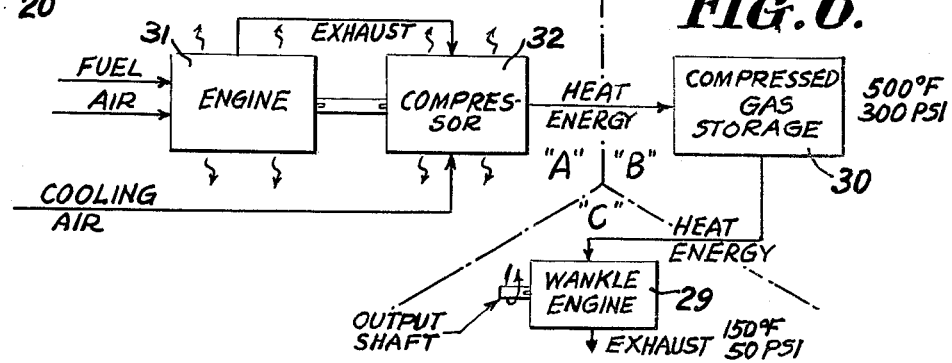

POWER DRIVE SYSTEM

SUMMARY OF THE INVENTION

The invention is directed toward achieving a substantial increase in the efficiency level of a powered internal combustion engine and drive train. This will be accomplished by utilizing an integral engine, compressor running at a constant rpm, a compressed gas storage tank, and a Wankel-type drive motor. This entire assembly will be enclosed by a series of ducts and baffles such that the radiant heat losses of the system will be absorbed by the incoming cooling air and be admitted to the system. Power is delivered to the wheels in automobile application through a series of wheel-mounted Wankel-type motors. These motors are driven by the hot expanding gases stored in the reservoir and originating at the internal combustion engine and amplified at the compressor. The use of a compressed air storage reservoir means the engine-like compressor section may be designed to run at a constant rpm and be of relatively small size since a large portion of a conventional arrangement is necessary to provide power reserve needed for acceleration and passing. This need would be supplied by the reservoir. The use of wheel-mounted drive motors eliminates the need of the conventional transmission, drive shaft and differential.

The potential advantages for this combination of drive components can be better appreciated when heat losses are compared in tabular form with a conventional internal combustion engine and the losses affecting efficiency of power input versus power output. Table No. 1 below sets forth the results of such comparison arrived at in a manner understood by those skilled in pertinent art.

TABLE I

| AREA | CONVENTIONAL | PROPOSED |
| --- | --- | --- |
| Coolant | 27% | N/A |
| Oil | 8% | N/A |
| Friction | 5% | 5% |
| Unburned Gas | 6% | 3% |
| Exhaust | 29% | 50% |
| Total Losses | 75% | 58% |
| Net Usage | 25% | 42% |
| TOTAL | 100% | 100% |

OBJECT OF THE INVENTION

It is an object of the invention to provide an improved power driven wheeled vehicle.

Another object of the invention is to provide an internal combustion engine and vehicle combination.

Another object of the invention is to provide an internal combustion engine, reservoir, compressor and gas driven motor combination for driving a vehicle.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF DRAWINGS

FIG. 1 is a diagrammatic view of the vehicle according to the invention.

FIG. 2 is a cross-sectional view of a Wankel-type motor which is used in the vehicle of FIG. 1 showing the rotor in the first position.

FIG. 3 shows the motor of FIG. 1 with a rotor moved in the second position.

FIG. 4 shows the rotor moved to the third position.

FIG. 5 shows the rotor moved to the fourth position.

FIG. 6 is a diagram of the drive arrangement according to the invention.

DETAILED DESCRIPTION OF DRAWINGS

Now, with more particular reference to the drawings, vehicle 16 is made up generally of frame 17 which also act as the cooling air duct that is supported on axles 18, 19, 20 and 21 and the axles are connected to the wheels 22, 23, 24 and 25 respectively. Suspension and steering components are conventional and are not shown. The Wankle-type drive motors 26, 27, 28 and 29 are connected to drive the axles 18, 19, 20 and 21 respectively.

The frame 17 supports the reservoir 30, the engine 31 and the compressor 32. Input for the operation of the system is in the form of air collected from the ram baffle 33 and directed over the brakes 34, 35, 36 and 37 as well as the Wankel drive motors 26, 27, 28 and 29. This air is also ducted around the reservoir 30, and finally admitted to the engine compartment through intake port 38. The purpose of ducting the input air around all of the active elements is to pick up any heat being radiated from these bodies and conducted back into the system.

Engine 31 derives its input air from the intake port 38 and runs at a constant rpm driving a compressor 32. The engine compressor combination cycles on and off at the command of a control valve which maintains a constant pressure in the reservoir 30. The compressor input is drawn from two sources (1) the exhaust from the drive engines 31 through pipe 39 and (2) the cooling air which is drawn in through the port 38 and passes over the air cooling fins of the engine/compressor and is sucked into the compressor input 40. The compressor output is ducted through pipes 41 and 42 into the reservoir 30. These gases will have a temperature of over 500° F. and a pressure of over 300 PSI and will consist of the normal byproducts of combustion, namely, $CO_2$, $H^2O$ and the normal atmospheric gases $O^2$, $N^2$, and $CO^2$, and $H^2O$. There will also be come unburned hydrocarbons and other related gases.

Ducting the engine exhaust into the compressor and storing the compressed output in a reservoir serves three purposes: (1) it increases the volumetric efficiency of the engine by reducing back pressure, (2) the energy normally lost out of the exhaust pipe or radiated out through the cooling fluids are contained. The ducting of the system also serves the same purpose by containing any heat loss through radiation. (3) By storing the compressed gases in a reservoir at a high temperature, the unburned hydrocarbons will react with the atmospheric $O^2$ completing the combustion process to a much higher degree of efficiency than currently achievable with the conventional internal combustion engine. The high temperature serves an additional purpose of keeping the $H^2O$ present in the gaseous state.

The drive motors pictured as Wankel type are connected from their input ports 43 to a control valve (not shown) and then to reservoir 30. The exhaust from the motors valve (not shown) and then to reservoir 30. The exhaust from the motors is ducted out their exhaust ports 44 through a muffler (not shown) to atmosphere. The control valve regulates the volume of compressed gas to the drive motors and thereby controls the speed of the vehicle. The Wankel drive motors themselves will be designed so that the exhaust gas will be below 150° F. and 50 PSI. This will allow the $H_2O$ to condense in the expansion chambers 10 and 11 thereby liberating more heat and energy and converting the heat and energy into mechanical work.

In FIG. 2 the casing 12 encloses the rotor 13, forming two chambers 10 and 11. The casing also contains two intake ports 14 and two exhaust ports 15. Not shown is a control valve connected between the intake port 14 and the reservoir 30. The view in FIG. 2 shows chamber 10 in the intake mode and chamber 11 in the ready for intake position. In FIG. 3, chamber 10 is in the expansion mode while chamber 11 is in the intake mode. In FIG. 4, chamber 10 is in the exhaust mode while chamber 11 is expanding. In FIG. 5 chamber 10 is in the exhaust mode and chamber 11 is in the exhaust mode. It is obvious from the above that there are two power cycles being conducted simultaneously within the rotor housing.

The foregoing specification sets forth the invention in its preferred practical forms but the structure shown is capable of modification within a range of equivalents without departing from the invention which is to be understood is broadly novel as is commensurate with the appended claims. The engine/compressor, for example, could be structured in many combinations such as Otto cycle engine and a centrifugal compressor, or a Wankel engine and a piston compressor, or a gas turbine engine and compressor combination. The drive motor could also take many forms, such as the pictured Wankel types or conventional piston or turbine. The ones described in detail are those which the inventor feels existing manufacturing complexes are now capable of producing without extensive modification.

The embodiments of the invention in which an exclusive property or privilege is claimed are defined as follows:

1. A vehicle comprising a frame, axles on said frame connected to wheels, air motors connected to each said axle, said frame defining and forming an essentially air tight enclosure,
   an air reservoir in said enclosure,
   an engine and an air compressor in said enclosure,
   said air compressor being connected to drive air into said reservoir,
   said engine having an exhaust directed into said compressor,
   and means to admit air into said enclosure between said reservoir and said frame for directing air to said engine and to said air compressor, and means connecting said reservoir to said air motors.

2. The vehicle recited in claim 1 wherein said vehicle has a ram baffle at the front end for receiving air and directing said air to said means to admit air into said enclosure.

3. The vehicle recited in claim 1 wherein an inlet is provided to said compressor at the end of said enclosure remote from said ram baffle.

4. The vehicle recited in claim 3 wherein each said axle has a brake thereon and said brake has cooling means and said cooling means is disposed in the flow path of air from said ram baffle to said inlet to said compressor whereby each of said brakes is cooled and the heated air directed into said compressor.

5. The method of converting heat energy from the combustion of hydrocarbon fuels in a conversion system including an internal combustion engine and a fluid compressor to mechanical work comprising the steps of:
   a. heating combustion air introduced into the internal combustion engine by passing said air initially over heat producing elements in said system including said I.C. engine and compressor,
   b. combining a portion of said heated air with fuel and effecting combustion of said combined mixture in said I.C. engine,
   c. exhausting the products of combustion from the I.C. engine into the intake of the fluid compressor,
   d. simultaneously introducing a further portion of said heated air into said compressor,
   e. utilizing the mechanical output of said I.C. engine to drive said fluid compressor to compress said heated air and said products of combustion,
   f. exhausting the output from said compressor into a holding reservoir and
   g. exhausting the compressed contents from said reservoir into mechanical conversion means to convert the available latent energy into useful mechanical work.

* * * * *